US010623925B2

(12) United States Patent
Itatsu

(10) Patent No.: US 10,623,925 B2
(45) Date of Patent: Apr. 14, 2020

(54) COMMUNICATION DEVICE, COMMUNICATION SYSTEM, AND COMMUNICATION CONTROL METHOD

(71) Applicant: ALPINE ELECTRONICS, INC., Tokyo (JP)

(72) Inventor: Takao Itatsu, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 15/955,306

(22) Filed: Apr. 17, 2018

(65) Prior Publication Data

US 2018/0376307 A1 Dec. 27, 2018

(30) Foreign Application Priority Data

Jun. 21, 2017 (JP) .................................. 2017-121316

(51) Int. Cl.
*H04W 4/46* (2018.01)
*H04W 4/80* (2018.01)
(Continued)

(52) U.S. Cl.
CPC ............. *H04W 4/46* (2018.02); *H04L 63/107* (2013.01); *H04W 4/029* (2018.02); *H04W 4/80* (2018.02);
(Continued)

(58) Field of Classification Search
CPC combination set(s) only.
See application file for complete search history.

(56) References Cited

U.S. PATENT DOCUMENTS

| 9,866,277 B2 * | 1/2018 | Wang .................... H04B 5/0037 |
| 2007/0146163 A1 * | 6/2007 | Annoni ................. G07B 15/063 340/932.2 |

(Continued)

FOREIGN PATENT DOCUMENTS

JP 2016-133882 A 7/2016

OTHER PUBLICATIONS

European Search Report for European Patent Application No. 18178521.3 dated Oct. 26, 2018; 9 pages.
(Continued)

*Primary Examiner* — Junpeng Chen
(74) *Attorney, Agent, or Firm* — Brinks Gilson & Lione

(57) ABSTRACT

A communication device to be mounted in a vehicle includes a short-range communication unit configured to perform a first wireless communication in a first communication range, a wide-area communication unit configured to perform a second wireless communication in a second communication range larger than the first communication range, a first information acquisition unit configured to acquire first vehicle information from another vehicle located in the first communication range, through the first wireless communication, a communication control unit configured to permit, when the first information acquisition unit has acquired the first vehicle information including predetermined information, acquisition of second vehicle information through the second wireless communication, and a second information acquisition unit configured to acquire, when the acquisition of the second vehicle information through the second wireless communication is permitted, the second vehicle information from another vehicle located in the second communication range, through the second wireless communication.

18 Claims, 13 Drawing Sheets

(51) Int. Cl.
   *H04L 29/06* (2006.01)
   *H04W 12/08* (2009.01)
   *H04W 4/029* (2018.01)
   *H04B 1/3822* (2015.01)
   *H04W 88/06* (2009.01)

(52) U.S. Cl.
   CPC ........... *H04W 12/08* (2013.01); *H04B 1/3822* (2013.01); *H04W 88/06* (2013.01)

(56) References Cited

U.S. PATENT DOCUMENTS

| | | | | |
|---|---|---|---|---|
| 2007/0171854 | A1* | 7/2007 | Chen et al. | G08G 1/205 370/328 |
| 2009/0292459 | A1* | 11/2009 | Zuccotti | G08G 1/096716 701/532 |
| 2012/0317161 | A1* | 12/2012 | Bai | G06F 17/30029 709/201 |
| 2013/0034016 | A1* | 2/2013 | Bai | H04W 40/28 370/254 |
| 2014/0139354 | A1* | 5/2014 | Miyazaki | B60L 11/1816 340/902 |
| 2014/0269604 | A1* | 9/2014 | Kamiya | H04L 5/0066 370/330 |
| 2015/0349885 | A1 | 12/2015 | Endo | |
| 2016/0355198 | A1* | 12/2016 | Dulmage | H04L 69/18 |
| 2017/0352201 | A1* | 12/2017 | Kumabe | G07C 5/008 |
| 2018/0054843 | A1* | 2/2018 | Stahlin | H04W 4/027 |

OTHER PUBLICATIONS

Tung, Lung-Chih et al.; "A Cluster Based Architecture for Intersection Collision Avoidance Using Heterogeneous Networks", 2013 12$^{th}$ Annual Mediterranean Ad Hoc Networking Workshop (MED-HOC-NET), IEEE, Jun. 24, 2013, pp. 82-88.

* cited by examiner

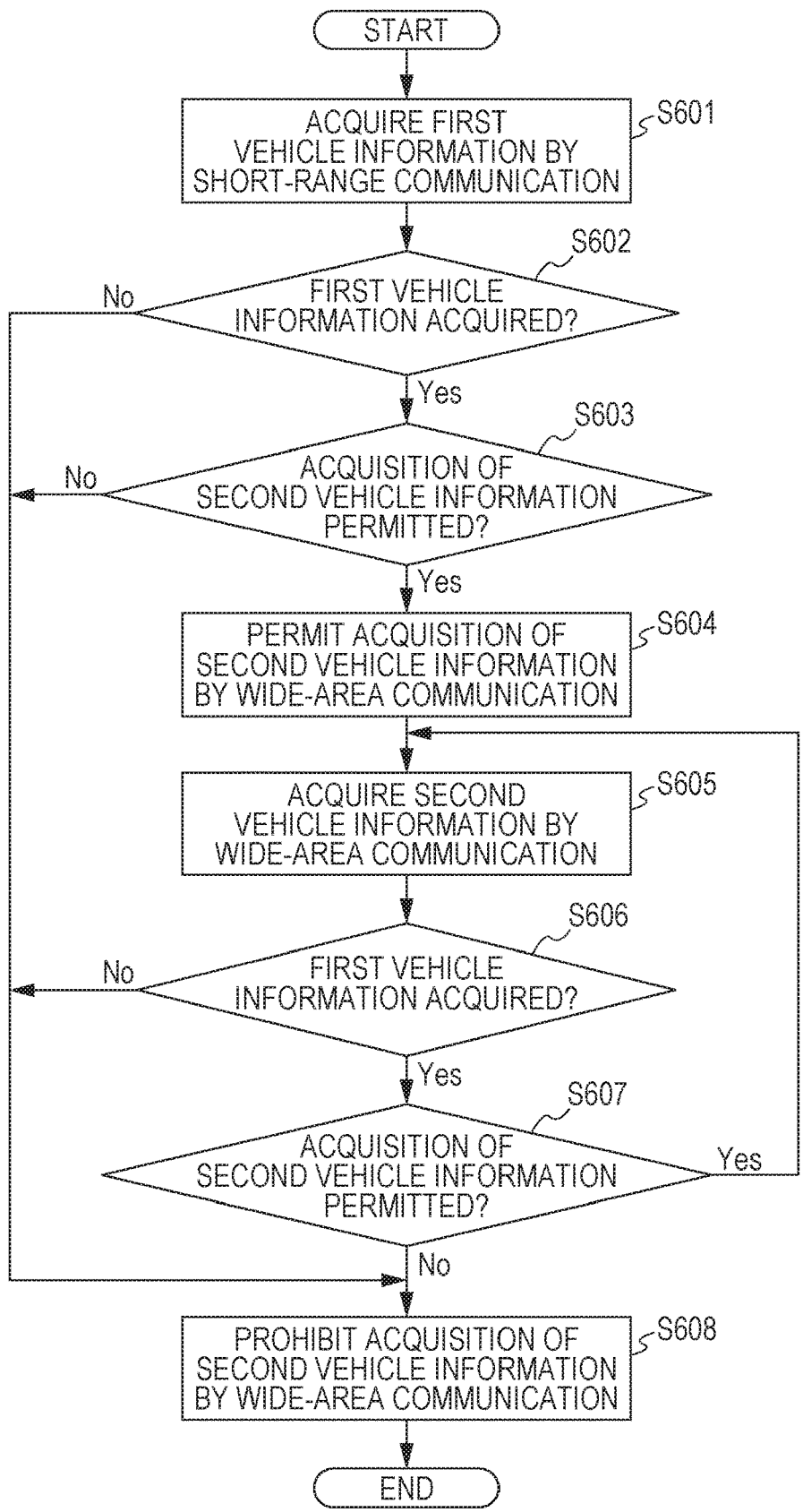

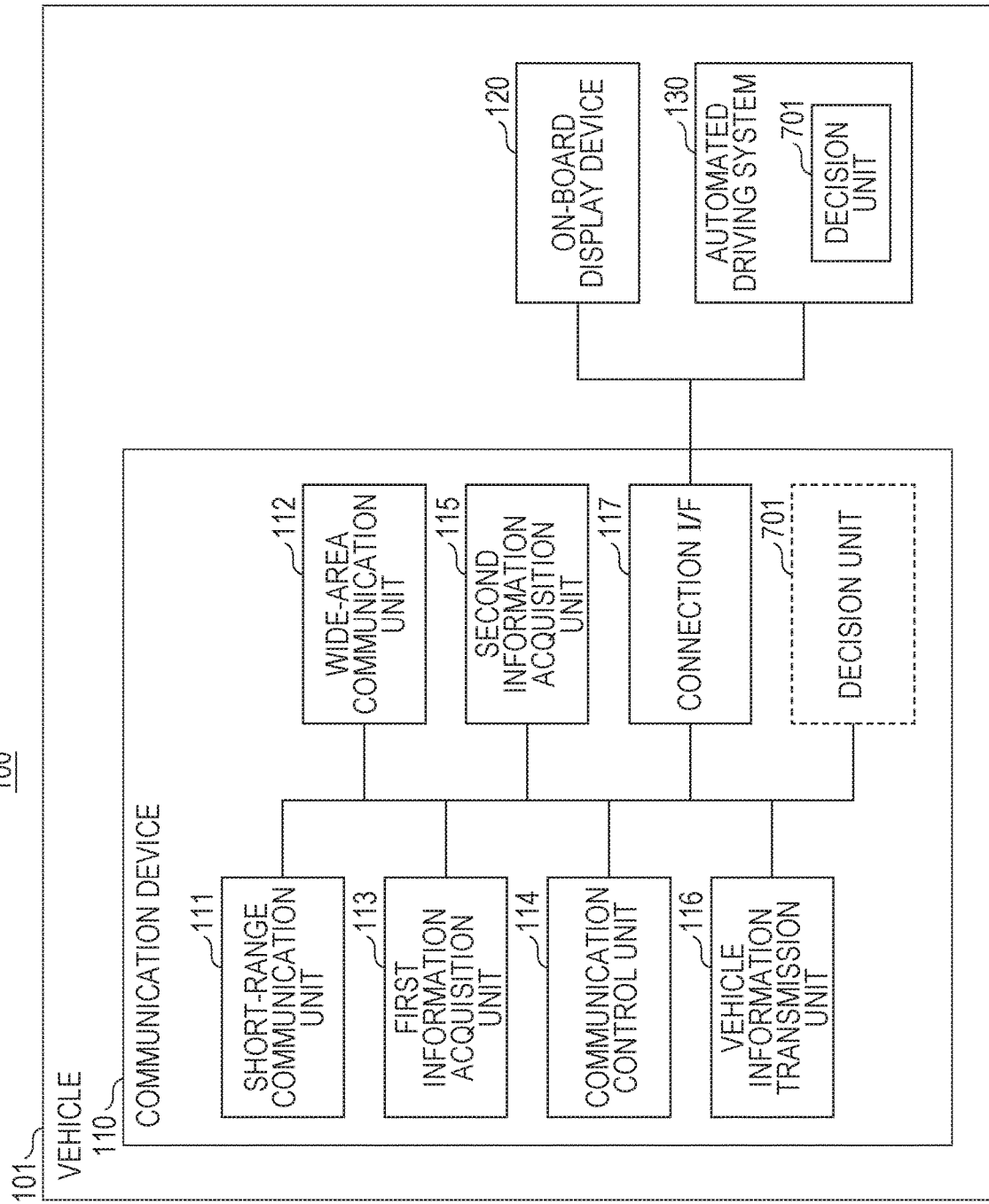

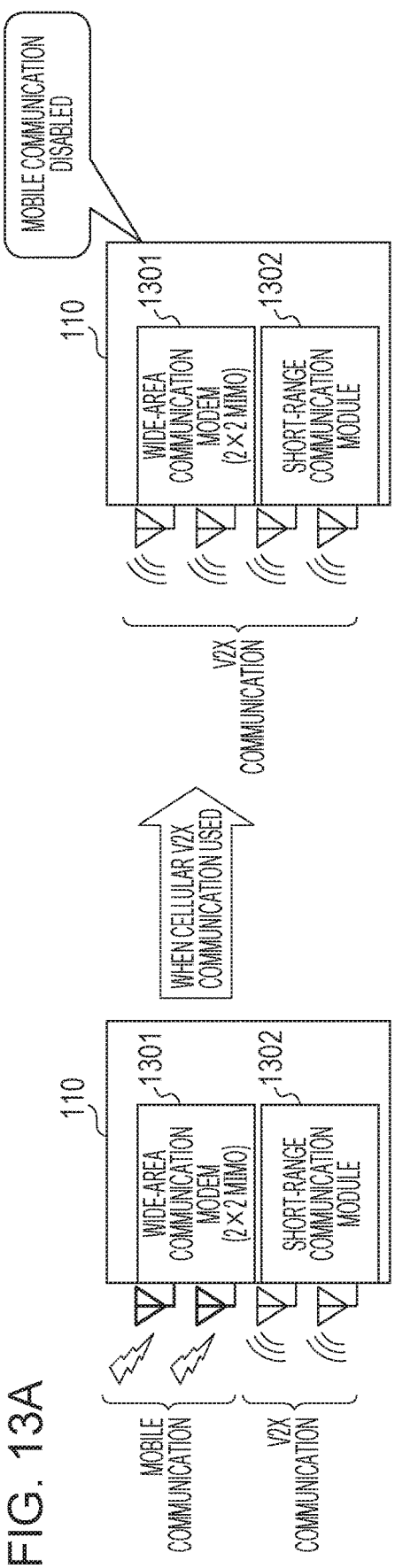
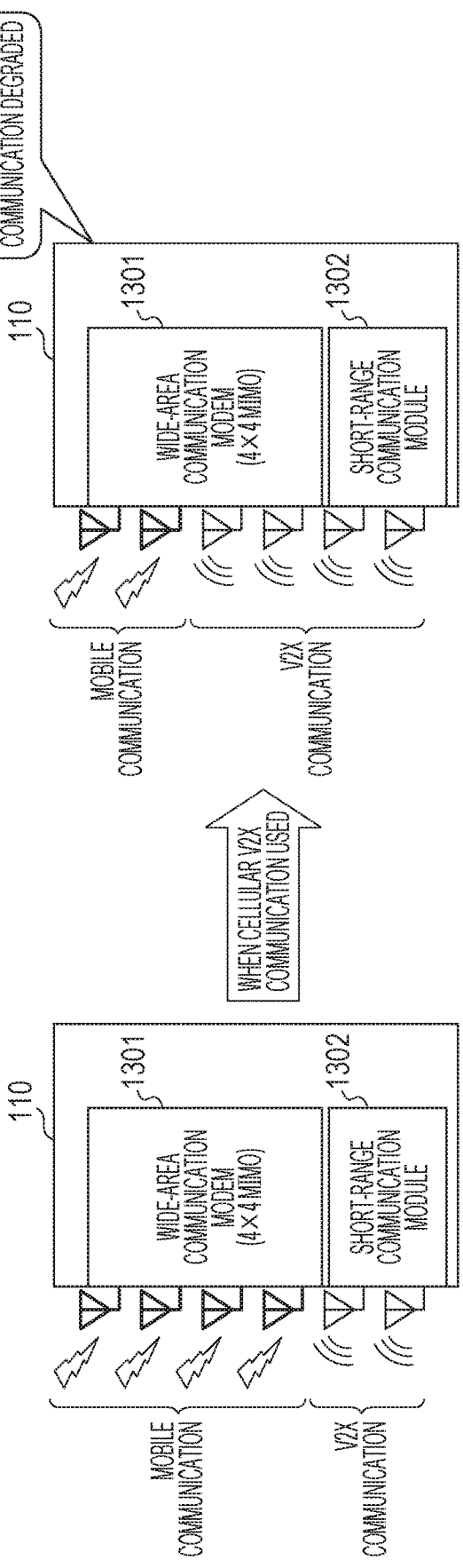
FIG. 13A
FIG. 13B

COMMUNICATION DEVICE, COMMUNICATION SYSTEM, AND COMMUNICATION CONTROL METHOD

RELATED APPLICATIONS

The present application claims priority to Japanese Patent Application Number 2017-121316, filed Jun. 21, 2017, the entirety of which is hereby incorporated by reference.

BACKGROUND

1. Field

The present disclosure relates to a communication device, a communication system, and a communication control method.

2. Description of the Related Art

Existing communication devices include those configured to perform vehicle-to-vehicle communication, between a vehicle and another vehicle, using IEEE 802.11p for 5.9 GHz band based on IEEE 802.11a, which is a communication standard for a wireless local area network (LAN).

For example, Japanese Unexamined Patent Application Publication No. 2016-133882 discloses a communication device including a wide-area communication unit connected to a data communication network, and a vehicle-to-vehicle communication unit that performs vehicle-to-vehicle communication with another vehicle by the communication method according to IEEE 802.11p, and configured to permit the vehicle-to-vehicle communication unit to transmit data, when a predetermined condition is satisfied.

Vehicle-to-everything (V2X) communication based on the communication method according to IEEE 802.11p, such as vehicle-to-infrastructure communication, or vehicle-to-pedestrian communication, is now compulsory in the United States, where vehicles are supposed to include such hardware.

Regarding cooperative automated driving, performed among the vehicles utilizing information acquired through the V2X communication, there is a requirement for a communication method that shortens response time compared with the communication method according to IEEE 802.11p. Accordingly, for example, utilization of cellular V2X communication based on cellular technology is being studied.

However, communication based on cellular technology, in other words wide-area communication, is utilized for mobile communication other than the V2X communication. Therefore, performing the V2X communication may degrade the throughput of the mobile communication, or even disable the mobile communication.

SUMMARY

The present disclosure is provided in view of the foregoing situation, and includes a communication device to be mounted in a vehicle that is configured to acquire vehicle information from another vehicle through wide-area communication, with a minimized impact on the mobile communication.

In one aspect, the present disclosure provides a communication device to be mounted in a vehicle. The communication device includes: a short-range communication unit configured to perform first wireless communication in a first communication range; a wide-area communication unit configured to perform second wireless communication in a second communication range larger than the first communication range; a first information acquisition unit configured to acquire first vehicle information from another vehicle located in the first communication range, through the first wireless communication; a communication control unit configured to permit, when the first information acquisition unit has acquired the first vehicle information including predetermined information, acquisition of second vehicle information through the second wireless communication; and, a second information acquisition unit configured to acquire, when the acquisition of the second vehicle information through the second wireless communication is permitted, the second vehicle information from another vehicle located in the second communication range, through the second wireless communication.

The foregoing configuration enables the communication device mounted in the vehicle to acquire the vehicle information from another vehicle through the wide-area communication, with a minimized impact on the mobile communication.

BRIEF DESCRIPTION OF THE DRAWINGS

FIG. 6 is a flowchart showing a third example of the communication control process according to the first embodiment;

FIG. 7 is a block diagram showing a configuration of a communication system according to a second embodiment;

FIG. 13A and FIG. 13B are schematic drawings each showing an example of a relation between V2X communication and mobile communication.

DETAILED DESCRIPTION

Hereafter, embodiments of the present disclosure will be described, with reference to the accompanying drawings. Before proceeding to description of a configuration of a communication device according to one embodiment, a summary of an exemplary automated driving system and vehicle-to-everything (V2X) communication will be described.

Automated Driving

Figure 11:
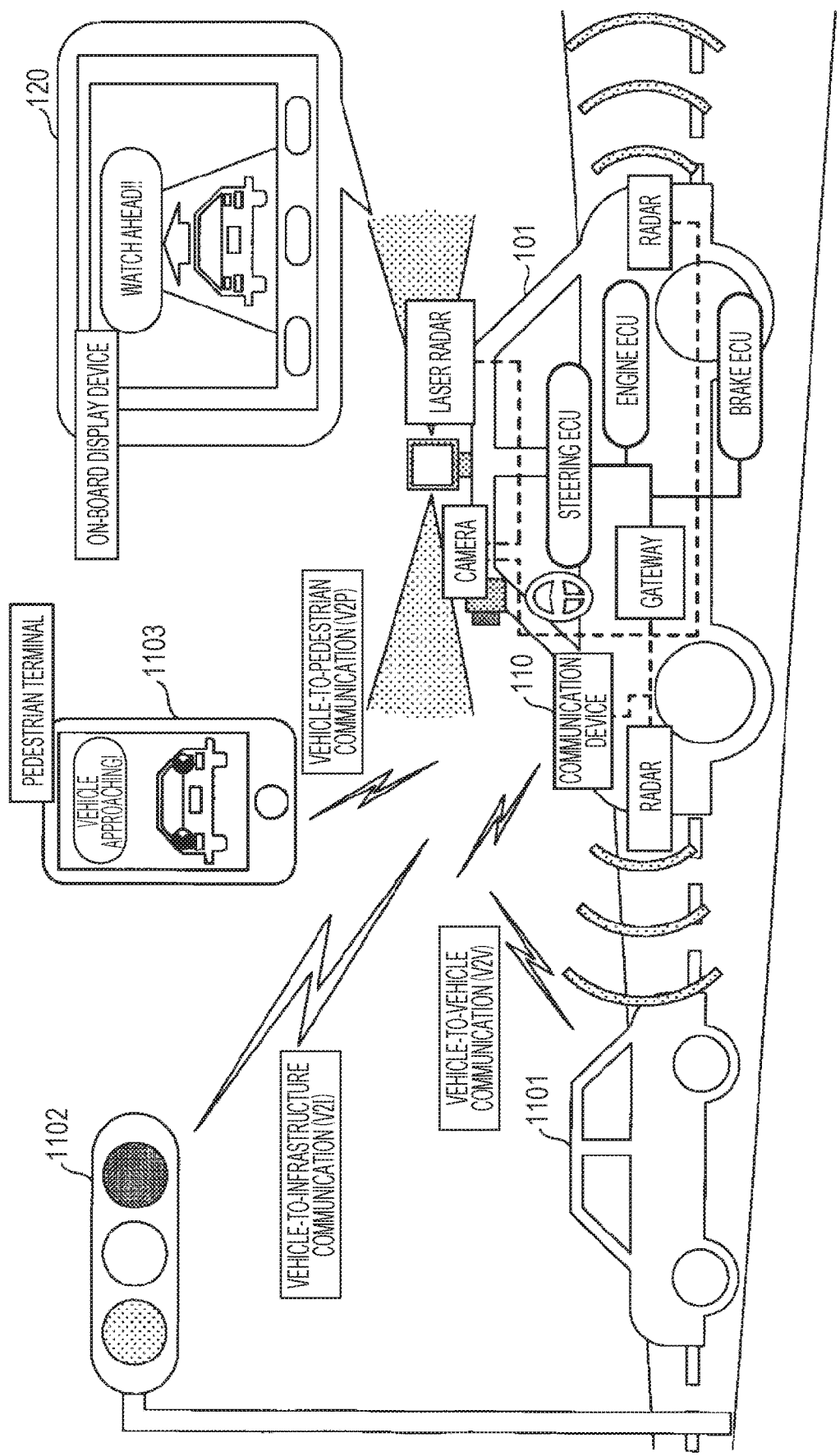
FIG. 11 is a schematic drawing showing an example of a concept of an automated driving.

FIG. 11 is a schematic drawing showing an example of the concept automated driving.

Currently, an autonomous automated driving system is being developed, for autonomously realizing the automated driving of a vehicle 101, for example an automobile, using an on-board sensor such as a camera or a radar mounted in the vehicle 101. One of the technical challenges that the autonomous automated driving system is facing is how to safely control the vehicle 101, in dangerous or hazardous situations such as merging, lane change, and entry in an intersection.

In relation to the autonomous automated driving system, further, a cooperative automated driving system is being studied, for realizing the automated driving of the vehicle 101 utilizing information acquired through V2X communication, performed by a communication device 110 mounted in the vehicle 101.

Here, V2X communication is the collective term of the communication between a vehicle and one or more communication counterparts, and includes, for example, vehicle-to-vehicle (V2V) communication for communicating with another vehicle 1101, vehicle-to-infrastructure (V2I) communication for communicating with a counterpart device 1102 installed on the road, and vehicle-to-pedestrian (V2P) communication for communicating with a pedestrian terminal 1103.

V2X communication enables ambient objects that are unable to be detected by an on-board sensor, for example a vehicle, equipment, and a pedestrian, to be recognized, to thereby allow the automated driving system of the vehicle 101 to control the vehicle 101 with higher safety.

V2X communication further enables the automated driving system of the vehicle 101 to display, for example on an on-board display device 120 in the vehicle 101, a message for attracting attention or announcing a danger at an earlier stage, on the basis of the information acquired through the V2X communication performed by the communication device 110.

Usage Example of V2X Communication

Figure 12:
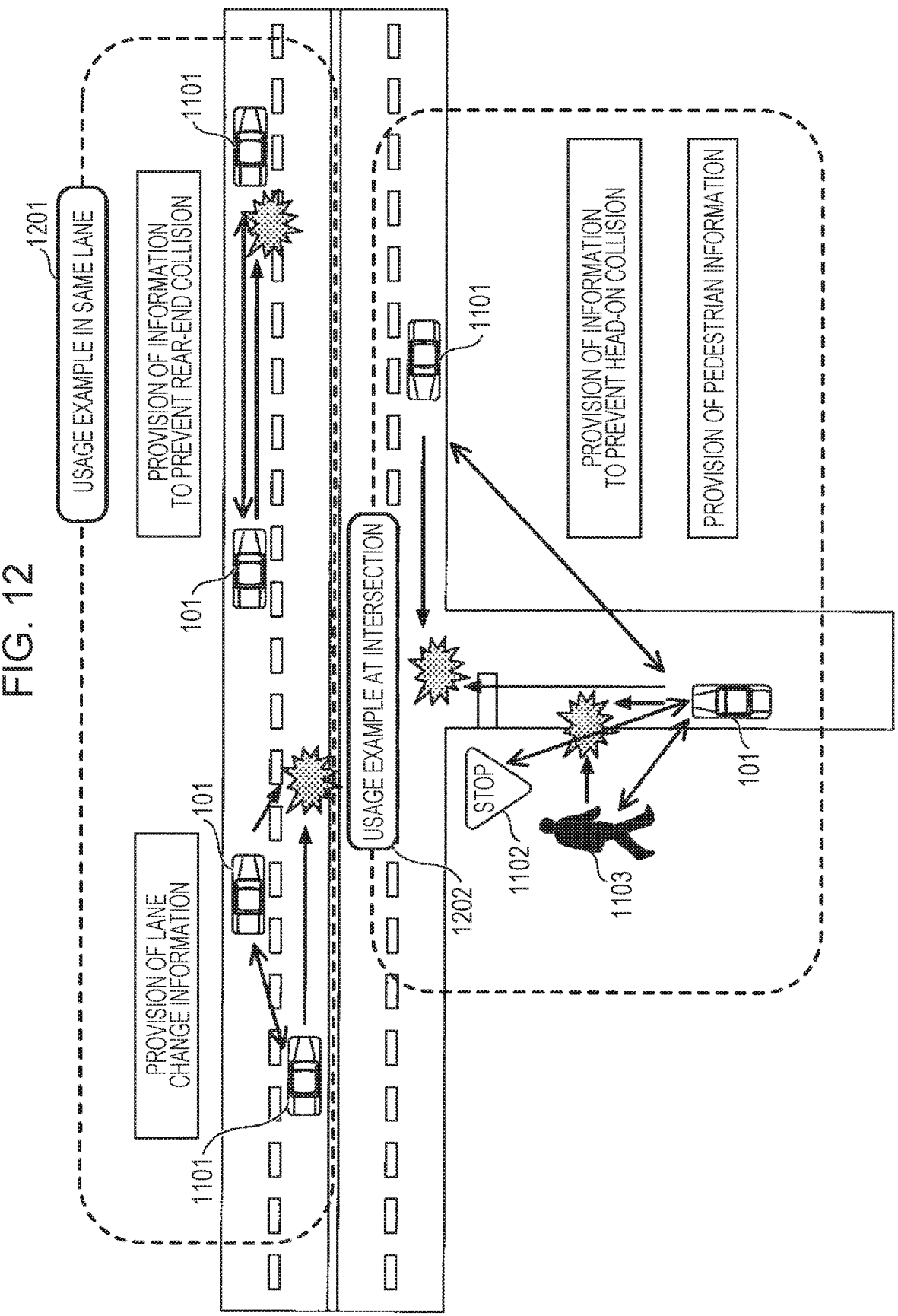
FIG. 12 is a schematic drawing showing usage examples of V2X communication.

FIG. 12 is a schematic drawing showing usage examples of the V2X communication.

In the "usage example in same lane 1201" shown in FIG. 12, the communication device 110 mounted in the vehicle 101 performs the vehicle-to-vehicle communication with the other vehicle 1101, to acquire various types of vehicle information such as position, speed, direction, acceleration, and size. Through such communication, the communication device 110 can provide the automated driving system of the vehicle 101 with information, for example, for changing the lane, or for preventing a rear-end collision.

In the "usage example at intersection 1202" shown in FIG. 12, the communication device 110 mounted in the vehicle 101 acquires information of the intersection through the vehicle-to-infrastructure communication with the counterpart device 1102 installed on the road, and also acquires the vehicle information through the vehicle-to-vehicle communication with the other vehicle 1101. Through such communication, the communication device 110 can provide the automated driving system of the vehicle 101 with information, for example, for changing the lane, or for preventing a head-on collision. In addition, the communication device 110 acquires information regarding a pedestrian located in the vicinity of the vehicle 101, through the vehicle-to-pedestrian communication with the pedestrian terminal 1103, to thereby provide the automated driving system of the vehicle 101 with information regarding the pedestrian.

Types of V2X Communication

The V2X communication includes short-range communication, more specifically dedicated short range communications (DSRC) compliant with IEEE 802.11p, and cellular V2X communication that employs the wide-area communication method based on cellular technology.

The short-range communication corresponds to the V2X communication that utilizes the technique according to IEEE 802.11p for 5.9 GHz band based on IEEE 802.11a, which is a communication standard for a wireless local area network (LAN). The short-range communication is now compulsory in the United States, where vehicles are supposed to include such hardware.

However, regarding cooperative automated driving, there is a requirement for a communication method that shortens the response time compared with short-range communications (approximately 100 ms), and the utilization of, for example, cellular V2X communication is being studied.

The cellular V2X communication is based on the wide-area communication method compliant with the third-generation partnership project (3GPP) standard, for example, long term evolution (LTE). The cellular V2X communication enables the V2X communication to be performed in a larger communication range than that of the short-range communication, and also provides a response time shorter than that of the short-range communication, which is approximately 100 ms. For example, with the cellular V2X communication based on the fifth-generation cellular technology, it is expected that the response time required for the cooperative automated driving, which is approximately 1 to 10 ms, is achieved.

The cellular V2X communication can be performed with the other vehicle 1101, both through a base station and directly with the other vehicle 1101. The following description will be given based on the assumption that the communication device 110 performs the cellular V2X communication directly with the other vehicle 1101.

Relation Between V2X Communication and Mobile Communication

As described above, for the vehicle 101 to execute cooperative automated driving, it is desirable to utilize cellular V2X communication that provides a shorter response time, to acquire the information necessary for the automated driving.

However, the modem for performing the wide-area communication (hereinafter, wide-area communication modem) is also utilized for data communication other than the V2X communication, for example acquisition of map data, viewing a website, and distribution of contents (hereinafter, modem communication).

FIG. 13A and FIG. 13B are schematic drawings each showing an example of a relation between V2X communication and mobile communication. For the wide-area communication (e.g., LTE), a multi input multi output (MIMO) technology that improves the communication rate and the communication quality, using a plurality of antennas, is employed.

FIG. 13A illustrates the case where the communication device 110 includes a wide-area communication modem 1301 having two transmission antennas and two reception antennas, thus constituting a 2×2 MIMO, and a short-range communication module 1302.

For example, as shown in the left section of FIG. 13A, the communication device 110 can perform the mobile communication using the 2×2 MIMO configuration, when the cellular V2X communication is not being performed. However, when the communication device 110 starts to perform the cellular V2X communication, the mobile communication may be disabled as shown in the right section of FIG. 13A, because of the wide-area communication modem 1301 being utilized for the cellular V2X communication.

FIG. 13B illustrates the case where the communication device 110 includes the wide-area communication modem 1301 having four transmission antennas and four reception antennas, thus constituting a 4×4 MIMO, and the short-range communication module 1302.

In this case, as shown in the left section of FIG. 13B, the communication device 110 can perform the mobile communication using the 4×4 MIMO configuration, when the cellular V2X communication is not being performed. However, when the communication device 110 starts to perform the cellular V2X communication, the number of antennas of the wide-area communication modem 1301 that can be used for the mobile communication is reduced to two, as shown in the right section of FIG. 13B, because two of the antennas are being utilized for the cellular V2X communication. As result, the throughput of the mobile communication may be degraded.

First Embodiment

Configuration of Communication System

Figure 1:
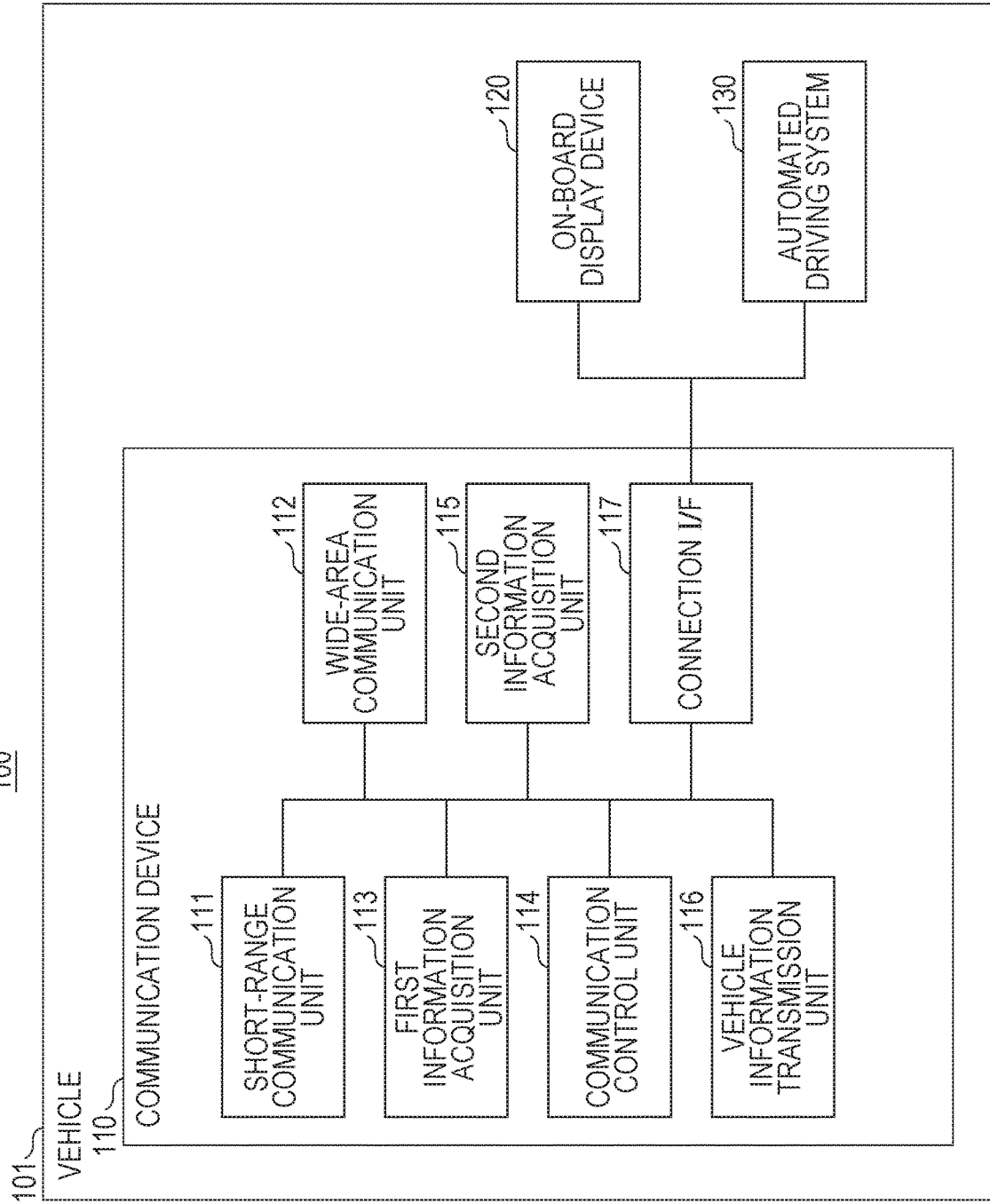
FIG. 1 is a block diagram showing a configuration of a communication system according to a first embodiment of the present disclosure.

To enable the vehicle information from another vehicle to be acquired through the cellular V2X communication with a minimized impact on the mobile communication, under the foregoing situation, the communication system 100 according to a first embodiment is configured, for example, as shown in FIG. 1.

FIG. 1 is a block diagram showing the configuration of the communication system according to the first embodiment. The communication system 100 includes the communication device 110 mounted on the vehicle 101 and connected to on-board apparatuses such as the on-board display device 120 and an automated driving system 130.

The communication device 110 includes, for example, a short-range communication unit 111, a wide-area communication unit 112, a first information acquisition unit 113, a communication control unit 114, a second information acquisition unit 115, a vehicle information transmission unit 116, and a connection interface (I/F) 117.

The short-range communication unit 111 corresponds to, for example, the short-range communication module 1302 shown in FIGS. 13A and 13B, and performs the short-range communication (first wireless communication) within a communication range of the short-range communication (first communication range), in compliance with IEEE 802.11p.

The wide-area communication unit 112 corresponds to, for example, the wide-area communication modem 1301 shown in FIGS. 13A and 13B, and performs the wide-area communication (second wireless communication) in a communication range of the wide-range communication (second communication range), which is larger than the communication range of the short-range communication.

The first information acquisition unit 113 may be realized, for example, by a program executed by a microcomputer or processor included in the communication device 110, to acquire, through the short-range communication, the vehicle information from another vehicle located within the communication range of the short-range communication.

Hereinafter, for the purpose of distinguishing between the vehicle information transmitted through the short-range communication and the vehicle information transmitted through the wide-area communication, the former will be referred to as "first vehicle information", and the latter will be referred to as "second vehicle information".

The communication control unit 114 may be realized, for example, by a program executed by the microcomputer or processor included in the communication device 110. The communication control unit 114 permits the acquisition of the second vehicle information through the wide-area communication, when the first information acquisition unit 113 has acquired the first vehicle information, including predetermined information.

Preferably, the communication control unit 114 may prohibit the acquisition of the second vehicle information through the wide-area communication, when the first information acquisition unit 113 has failed to acquire the first vehicle information including the predetermined information.

As an example, the communication control unit 114 may permit the acquisition of the second vehicle information through the wide-area communication, when the first information acquisition unit 113 has acquired the first vehicle information including predetermined header information, for example the header information compliant with IEEE 802.11p.

As another example, the communication control unit 114 may permit the acquisition of the second vehicle information through the wide-area communication, when the first information acquisition unit 113 has acquired first vehicle information including information indicating that the second vehicle information can be provided through the wide-area communication.

Further, the communication control unit 114 may permit the acquisition of the second vehicle information through the wide-area communication, when the first information acquisition unit 113 has acquired first vehicle information including position information related to the running route of the own vehicle (vehicle 101).

The second information acquisition unit 115 may be realized, for example, by a program executed by the microcomputer included in the communication device 110, to acquire, through the wide-area communication, the second vehicle information from another vehicle located in the range of the wide-area communication, when the acquisition of the second vehicle information through the wide-area communication is permitted.

The vehicle information transmission unit 116 may be realized, for example, by a program executed by the microcomputer or processor included in the communication device 110, to transmit the first vehicle information of the own vehicle, through the short-range communication.

Preferably, the first vehicle information transmitted by the vehicle information transmission unit 116 may include information indicating that the second vehicle information can be provided (or is unable to be provided), through the wide-area communication.

Preferably, the vehicle information transmission unit 116 may transmit the second vehicle information of the own vehicle through the wide-area communication, when the communication control unit 114 permits the acquisition of the second vehicle information through the wide-area communication.

The connection I/F 117 is used for connection between the communication device 110 and other on-board apparatuses such as the on-board display device 120 and the automated driving system 130. The communication device 110 notifies, for example, the first vehicle information acquired by the first information acquisition unit 113, and the second vehicle information acquired by the second information acquisition unit 115 to the other on-board apparatus, via the connection I/F 117.

The on-board display device 120 may include different information processing devices having at least a display function, for example a car navigation unit.

The automated driving system 130 serves to control the automated driving of the vehicle 101, on the basis of the vehicle information (e.g., first vehicle information and second vehicle information) notified from the communication device 110.

In this embodiment, the on-board display device 120 and the automated driving system 130 may be configured as desired.

The configuration of the communication system 100 shown in FIG. 1 is merely exemplary, and various different configurations may be adopted for the communication system 100. For example, the short-range communication unit 111, the wide-area communication unit 112, and/or other units included in the communication device 110 may be provided outside the communication device 110. In addition, at least a part of those units included in the communication device 110 may be included in the other on-board apparatus, for example the automated driving system 130.

Vehicle Information

Examples of the information included in the first vehicle information transmitted through the short-range communication, and in the second vehicle information transmitted through the wide-area communication, will now be described.

Figure 2:
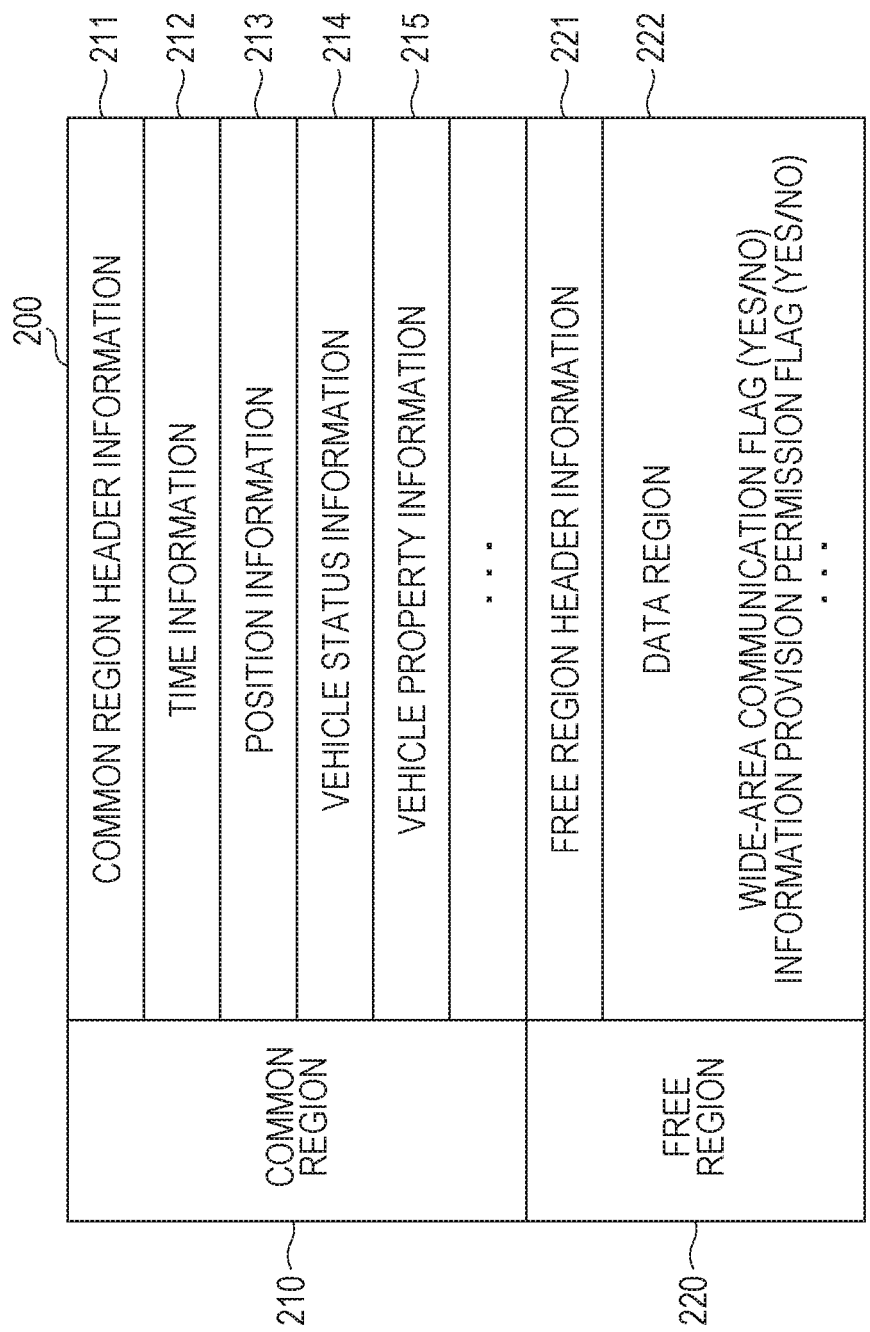
FIG. 2 is a table showing an example of information included in vehicle information according to the first embodiment.

FIG. 2 is a table showing an example of the information included in the vehicle information according to the first embodiment. As shown in FIG. 2, the vehicle information table 200 includes a common region 210 for storing the information included in common in the first and second vehicle information, and a free region 220 for storing any desired information.

The common region 210 may include, for example, common region header information 211, time information 212, position information 213, vehicle status information 214, and vehicle property information 215.

The common region header information 211 may include, for example, a standard ID for identifying the standard corresponding to the vehicle information table 200, a message ID for identifying the type of the message, and a vehicle ID for identifying the vehicle 101.

The time information 212 may include, for example, the time (hour, minute, and second) at which the vehicle information has been transmitted.

The position information 213 may include, for example, coordinate information indicating the position of the vehicle 101, such as latitude, longitude, and altitude.

The vehicle status information 214 may include, for example, the status of the vehicle 101 such as speed, direction, and acceleration.

The vehicle property information 215 may include, for example, the properties of the vehicle 101 such as size, type, and purpose of use.

The common region 210 may also include, in addition to the above, various types of information such as intersection information, more detailed vehicle information, emergency vehicle information, and road construction information.

The free region 220 may include, for example, free region header information 221 and a data region 222. The free region header information 221 may include the header information of any desired format. The data region 222 may store data of any desired format.

In this embodiment, preferably, the data region 222 for the first vehicle information may include the information indicating that the communication device 110 (or vehicle 101) can (or cannot) provide the second vehicle information through the wide-area communication.

For example, as shown in FIG. 2, the data region 222 for the first vehicle information may include a "wide-area communication flag" indicating whether the vehicle 101 is designed to perform the wide-area communication, and an "information permission flag" indicating whether the vehicle 101 can provide the second vehicle information.

The wide-area communication flag is set to "YES" when the communication device 110 (or vehicle 101) is designed to perform the wide-area communication, and to "NO" in the negative case. In the negative case, the wide-area communication flag itself may be omitted.

The information permission flag is set to "YES" when the communication device 110 (or vehicle 101) can provide the second vehicle information through the wide-area communication, and to "NO" in the negative case. In the negative case, the information permission flag itself may be omitted.

Here, the wide-area communication flag and the information permission flag are examples of the information indicating whether the communication device 110 (or vehicle 101) can provide the second vehicle information through the wide-area communication.

Further, the vehicle information table 200 shown in FIG. 2 is merely an example. It suffices that the first vehicle information and the second vehicle information each include the information corresponding to the items shown in the vehicle information table 200 of FIG. 2. Here, the wide-area communication flag and the information permission flag are unnecessary for the second vehicle information.

Concept of Communication Process

Figure 3:
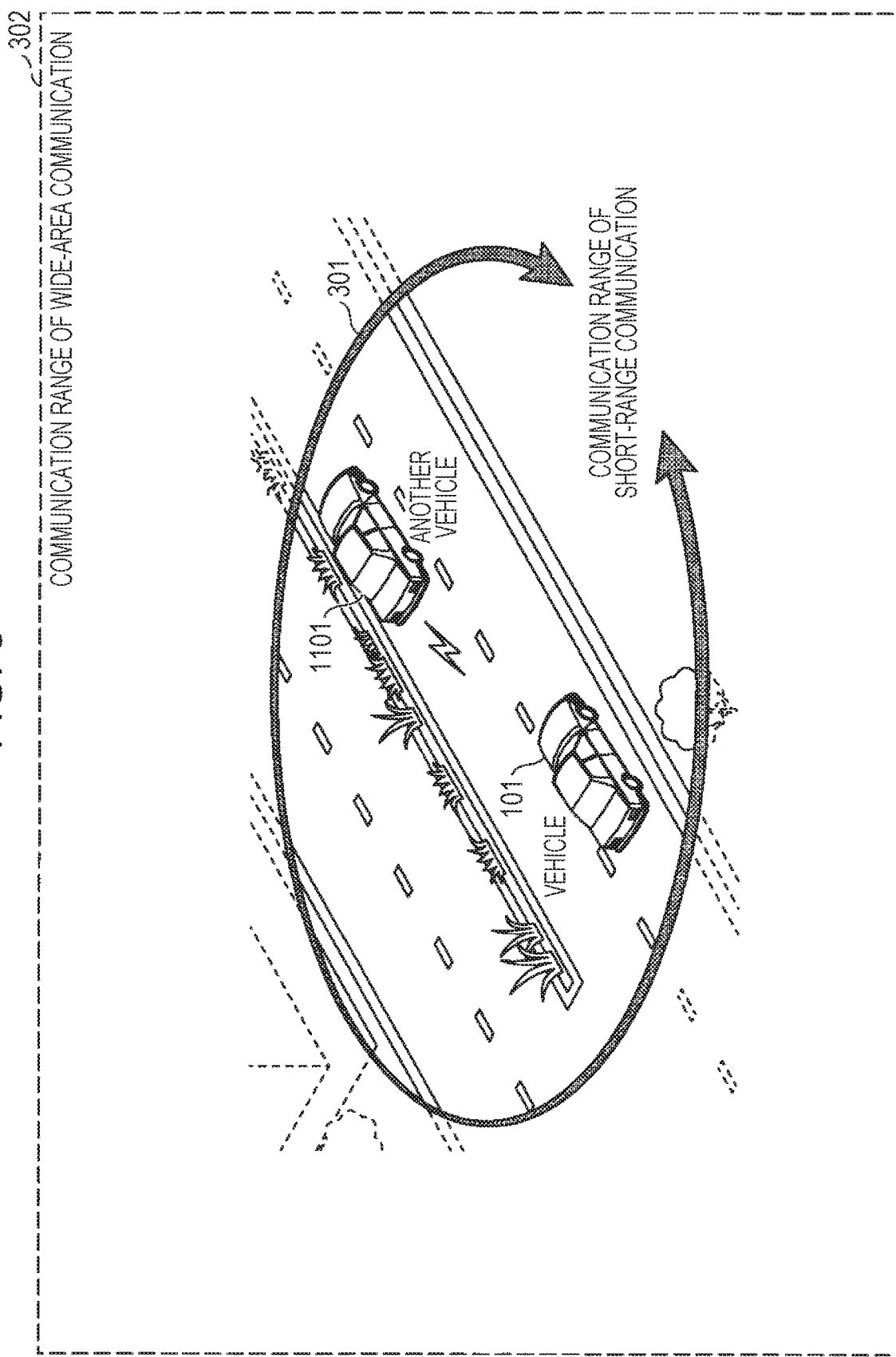
FIG. 3 is a schematic drawing showing a concept of operation executed by the communication system according to the first embodiment.

FIG. 3 is a schematic drawing showing a concept of the operation executed by the communication system according to the first embodiment. It will be assumed that in FIG. 3 the short-range communication unit 111 of the communication device 110 mounted in the vehicle 101 is receiving the first vehicle information through the short-range communication, inside the communication range 301.

The communication control unit 114 of the communication device 110 permits the acquisition of the second vehicle information through the wide-area communication, when the first information acquisition unit 113 has acquired the first vehicle information including the predetermined information, transmitted from the other vehicle 1101. Accordingly, the second information acquisition unit 115 of the communication device 110 starts to acquire the second vehicle information from the other vehicle 1101 located inside the communication range 302, using the wide-area communication unit 112.

On the other hand, the communication control unit 114 of the communication device 110 prohibits the acquisition of the second vehicle information through the wide-area communication, when the first information acquisition unit 113 is unable to acquire the first vehicle information including the predetermined information, transmitted from the other vehicle 1101. Accordingly, the second information acquisition unit 115 of the communication device 110 finishes the acquisition of the second vehicle information, through the wide-area communication unit 112.

The mentioned operation enables the communication device 110, mounted in the vehicle 101 and intended to acquire the second vehicle information from the other vehicle 1101 through the wide-area communication, to acquire the second vehicle information from the other vehicle 1101, with a minimized impact on the mobile communication.

Operation Flow

Specific examples of the communication control process according to this embodiment will now be described.

Communication Control Process 1

Figure 4:
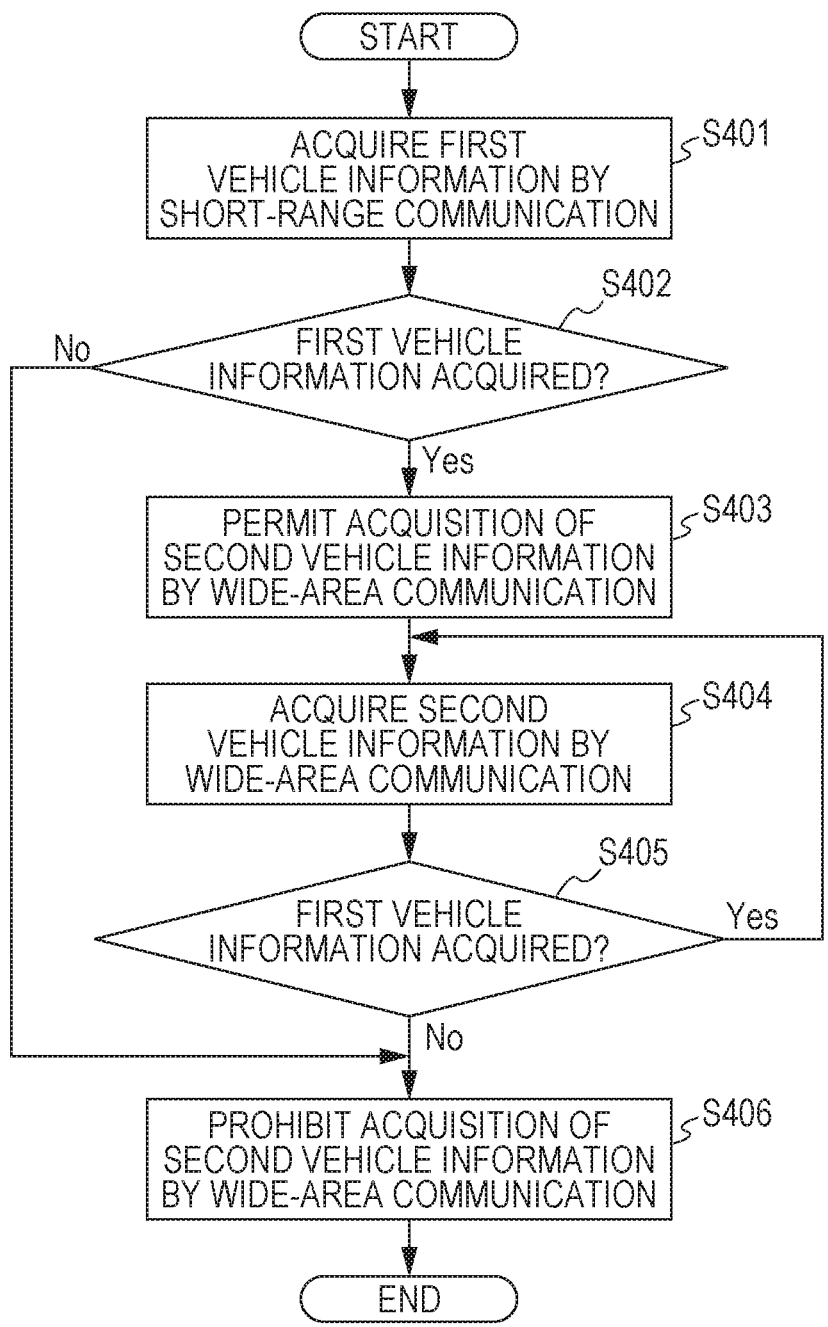
FIG. 4 is a flowchart showing a first example of a communication control process according to the first embodiment.

FIG. 4 is a flowchart showing a first example of the communication control process according to the first embodiment. This flowchart represents an example of the basic communication control process executed by the communication system 100. In the following description, it will be assumed that, at the start of the process shown in FIG. 4, the communication device 110 is permitted to perform the V2X communication using the short-range communication unit 111, but prohibited from performing the V2X communication using the wide-area communication unit 112.

At step S401, the first information acquisition unit 113 acquires, through the short-range communication, the first vehicle information from the other vehicle 1101 located inside the communication range 301 of the short-range communication. Here, it will also be assumed that the first information acquisition unit 113 continuously acquires the first vehicle information, thereafter.

The first vehicle information acquired by the first information acquisition unit 113 is notified to the automated driving system 130, for example via the connection I/F 117.

At step S402, the communication control unit 114 decides whether the first information acquisition unit 113 has acquired the first vehicle information.

At this point, it will be assumed that the communication control unit 114 decides that the first vehicle information has been acquired, in the case where the first vehicle information acquired by the first information acquisition unit 113 includes the predetermined header information (e.g., header information compliant with IEEE 802.11p). Conversely, in the case where the first vehicle information acquired by the first information acquisition unit 113 does not include the predetermined header information, or where the first information acquisition unit 113 has failed to acquire information from the other vehicle 1101, the communication control unit 114 decides that the first information acquisition unit 113 has failed to acquire the first vehicle information.

In the case where the first information acquisition unit 113 has failed to acquire the first vehicle information, the communication control unit 114 proceeds to step S406. In contrast, in the case where the first information acquisition unit 113 has acquired the first vehicle information, the communication control unit 114 proceeds to step S403.

Upon proceeding to step S403, the communication control unit 114 permits the acquisition of the second vehicle information through the wide-area communication. Accordingly, the second information acquisition unit 115 is enabled to acquire the second vehicle information, using the wide-area communication unit 112.

Here, even when the acquisition of the second vehicle information through the wide-area communication is not permitted, the modem communication through the wide-area communication, described with reference to FIGS. 13A and 13B, can be performed.

At step S404, the second information acquisition unit 115 acquires the second vehicle information, through the wide-area communication performed by the wide-area communication unit 112. The second vehicle information acquired by the second information acquisition unit 115 is notified to the automated driving system 130, for example via the connection I/F 117.

Now, since the acquisition of the second vehicle information is regarded as normally having higher degree of urgency and importance than the modem communication, it is desirable, under the configuration of 2×2 MIMO as shown in FIG. 13A, that the second information acquisition unit 115 suspends the modem communication, to acquire the second vehicle information. Instead, the second information acquisition unit 115 may decide whether to suspend or continue with the modem communication, depending on the priority of the content of the modem communication.

At step S405, the communication control unit 114 again decides whether the first information acquisition unit 113 has acquired the first vehicle information.

In the case where the first information acquisition unit 113 has failed to acquire the first vehicle information, the communication control unit 114 proceeds to step S406. In contrast, in the case where the first information acquisition unit 113 has acquired the first vehicle information, the communication control unit 114 returns to step S404, and allows the second information acquisition unit 115 to continue with the acquisition of the second vehicle information through the wide-area communication.

Upon proceeding to step S406, the communication control unit 114 prohibits the acquisition of the second vehicle information through the wide-area communication. Accordingly, the second information acquisition unit 115 is disabled from acquiring the second vehicle information using the wide-area communication unit 112.

Through the foregoing process, the communication device 110 is restricted from acquiring the second vehicle information through the wide-area communication, when the first vehicle information including the predetermined header information is unable to be acquired through the short-range communication. Such an arrangement minimizes the impact of the wide-area communication on the mobile communication.

Conversely, the communication device 110 can acquire the second vehicle information through the wide-area communication, when the first vehicle information including the predetermined header information has been acquired, through the short-range communication.

Communication Control Process 2

Figure 5:
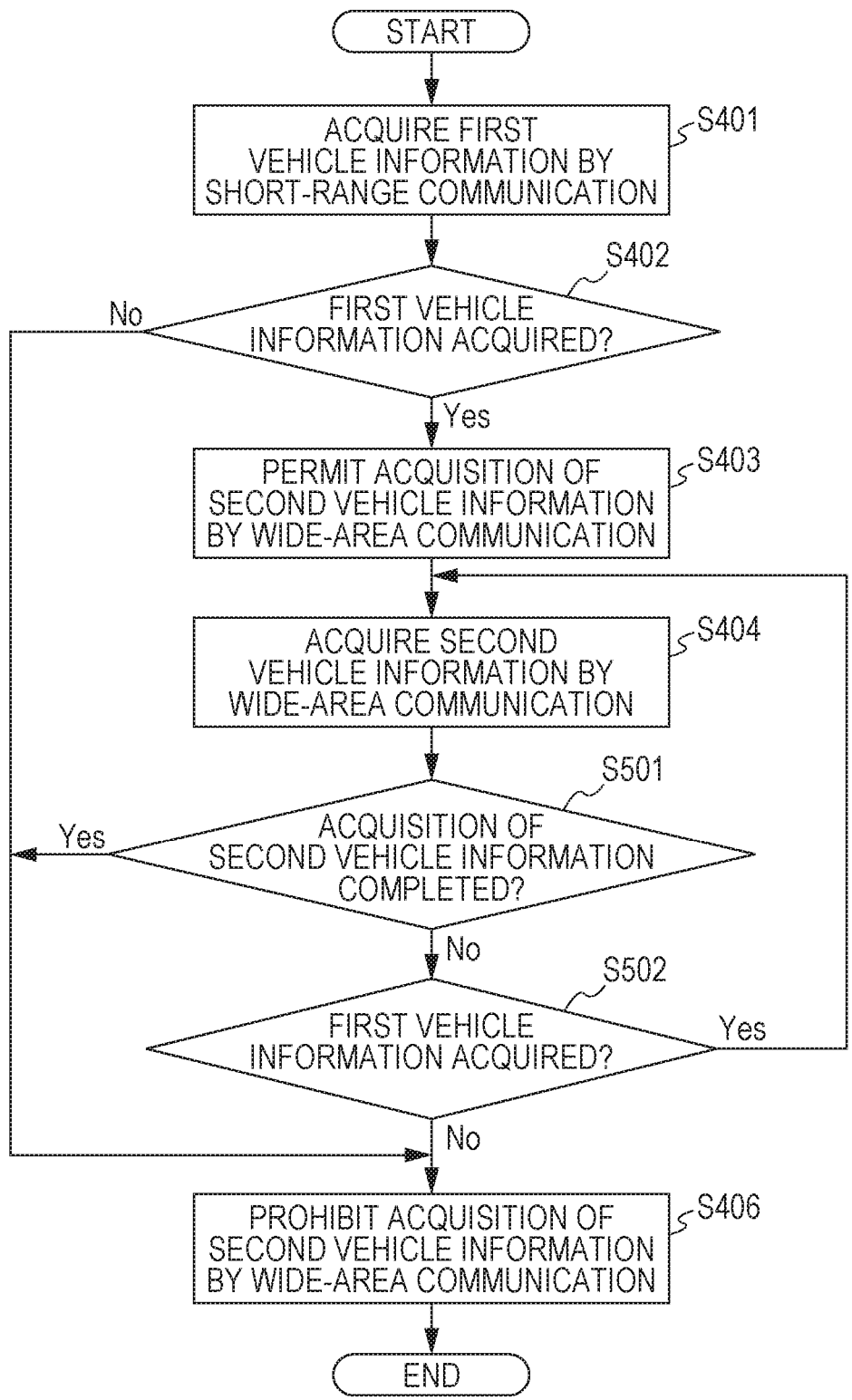
FIG. 5 is a flowchart showing a second example of the communication control process according to the first embodiment.

FIG. 5 is a flowchart showing a second example of the communication control process according to the first embodiment. Out of the steps shown in FIG. 5, steps S401 to S404, and step S406, are the same as the corresponding steps of the communication control process 1 shown in FIG. 4. Therefore, the following description will focus on the differences from the communication control process 1 shown in FIG. 4.

At step S501, the communication control unit 114 decides whether the second information acquisition unit 115 has completed the acquisition of the second vehicle information.

To decide whether the acquisition of the second vehicle information has been completed, any desired condition according to the requirement of the system may be employed. For example, it may be decided that the acquisition of the second vehicle information has been completed, when only such second vehicle information that is unrelated to the automated driving of the vehicle 101 has been acquired.

In the case where the acquisition of the second vehicle information by the second information acquisition unit 115 has been completed, the communication control unit 114 proceeds to step S406. In contrast, in the case where the acquisition of the second vehicle information by the second information acquisition unit 115 has not been completed, the communication control unit 114 proceeds to step S502.

Upon proceeding to step S502, the communication control unit 114 decides whether the first information acquisition unit 113 has acquired the first vehicle information.

In the case where the first information acquisition unit 113 has failed to acquire the first vehicle information, the communication control unit 114 proceeds to step S406. In contrast, in the case where the first information acquisition unit 113 has acquired the first vehicle information, the communication control unit 114 returns to step S404, to allow the second information acquisition unit 115 to continue with the acquisition of the second vehicle information through the wide-area communication.

Through the foregoing process, the communication device 110 can minimize the impact of the wide-area communication on the mobile communication, when the acquisition of the second vehicle information through the wide-area communication is completed, in addition to when the first vehicle information including the predetermined header information is unable to be acquired through the short-range communication.

Thus, the control process according to the foregoing examples enables the communication device 110 mounted in the vehicle 101 and configured to acquire the vehicle information from another vehicle through the wide-area communication, to acquire the vehicle information from the other vehicle with a minimized impact on the mobile communication.

Communication Control Process 3

As a third example, the process to be executed when the predetermined information is the "information indicating that the second vehicle information can be provided through the wide-area communication" will be described hereunder.

FIG. 6 is a flowchart showing the third example of the communication control process according to the first embodiment. The basic process is the same as the steps of the communication control process 1 shown in FIG. 4, and therefore, a detailed description of the similar steps will not be repeated.

At step S601, the first information acquisition unit 113 acquires, through the short-range communication, the first vehicle information from the other vehicle 1101 located inside the communication range 301 of the short-range communication.

At step S602, the communication control unit 114 decides whether the first information acquisition unit 113 has acquired the first vehicle information.

In the case where the first information acquisition unit 113 has failed to acquire the first vehicle information, the communication control unit 114 proceeds to step S608. In contrast, in the case where the first information acquisition unit 113 has acquired the first vehicle information, the communication control unit 114 proceeds to step S603.

Upon proceeding to step S603, the communication control unit 114 decides whether the second vehicle information can be acquired through the wide-area communication, on the basis of the first vehicle information acquired by the first information acquisition unit 113.

As an example, the communication control unit 114 may utilize the information permission flag shown in FIG. 2, out of the information included in the first vehicle information, to decide whether the second vehicle information can be acquired through the wide-area communication.

For example, when the vehicle information in which the information permission flag is set to YES is included in the first vehicle information acquired by the first information acquisition unit 113, the communication control unit 114 decides that the second vehicle information can be acquired through the wide-area communication.

On the other hand, when the vehicle information in which the information permission flag is set to YES is not included in the first vehicle information acquired by the first information acquisition unit 113, the communication control unit 114 decides that the second vehicle information is unable to be acquired through the wide-area communication.

As another example, the communication control unit 114 may utilize the wide-area communication flag shown in FIG. 2, out of the information included in the first vehicle information, to decide whether the second vehicle information can be acquired through the wide-area communication. Further, the communication control unit 114 may utilize both of the wide-area communication flag and the information permission flag, to decide whether the second vehicle information can be acquired through the wide-area communication. Still further, the communication control unit 114 may utilize information other than the wide-area communication flag and the information permission flag, to decide whether the second vehicle information can be acquired through the wide-area communication.

When the second vehicle information is unable to be acquired through the wide-area communication, the communication control unit 114 proceeds to step S608. In contrast, when the second vehicle information can be acquired through the wide-area communication, the communication control unit 114 proceeds to step S604.

Upon proceeding to step S604, the communication control unit 114 permits the acquisition of the second vehicle information through the wide-area communication.

Through the mentioned steps S602 to S604, the communication control unit 114 permits the acquisition of the second vehicle information through the wide-area communication, in the case where the first information acquisition unit 113 has acquired the first vehicle information including the information indicating that the second vehicle information can be acquired through the wide-area communication.

At step S605, the second information acquisition unit 115 acquires the second vehicle information through the wide-area communication, using the wide-area communication unit 112.

At step S606, the communication control unit 114 again decides whether the first information acquisition unit 113 has acquired the first vehicle information.

In the case where the first information acquisition unit 113 has failed to acquire the first vehicle information, the communication control unit 114 proceeds to step S608. In contrast, in the case where the first information acquisition unit 113 has acquired the first vehicle information, the communication control unit 114 proceeds to step S607.

At step S607, the communication control unit 114 decides whether the second vehicle information can be acquired through the wide-area communication, on the basis of the first vehicle information acquired by the first information acquisition unit 113, in the same way as step S602.

When the second vehicle information is unable to be acquired through the wide-area communication, the communication control unit 114 proceeds to step S608. In contrast, when the second vehicle information can be acquired through the wide-area communication, the communication control unit 114 returns to step S605, and permits continued acquisition of the second vehicle information through the wide-area communication.

Upon proceeding to step S608, the communication control unit 114 prohibits the acquisition of the second vehicle information through the wide-area communication.

Through the foregoing process, the communication control unit 114 prohibits the acquisition of the second vehicle information through the wide-area communication, in the case where the first information acquisition unit 113 has failed to acquire the first vehicle information including the information indicating that the second vehicle information can be provided through the wide-area communication. Such an arrangement further minimizes the impact of the acquisition of the second vehicle information through the wide-area communication, on the mobile communication.

In this example also, the communication control unit 114 may prohibit the acquisition of the second vehicle information through the wide-area communication, when the acquisition of the second vehicle information through the wide-area communication has been completed, for example through step S501 shown in FIG. 5.

Second Embodiment

A second embodiment represents the case where the predetermined information is position information related to the running route of the vehicle 101.
Configuration of Communication System FIG. 7 is a block diagram showing a configuration of the communication system according to the second embodiment. The communication system 100 according to the second embodiment includes a decision unit 701, in addition to the configuration of the communication system 100 according to the first embodiment shown in FIG. 1. The decision unit 701 may be included, for example, in the automated driving system 130, or in the communication device 110.

The decision unit 701 decides whether the position information, included in the first vehicle information acquired by the first information acquisition unit 113, is related to the running route of the own vehicle (vehicle 101), for example using map information on the geography around the own vehicle.

Figure 8B:
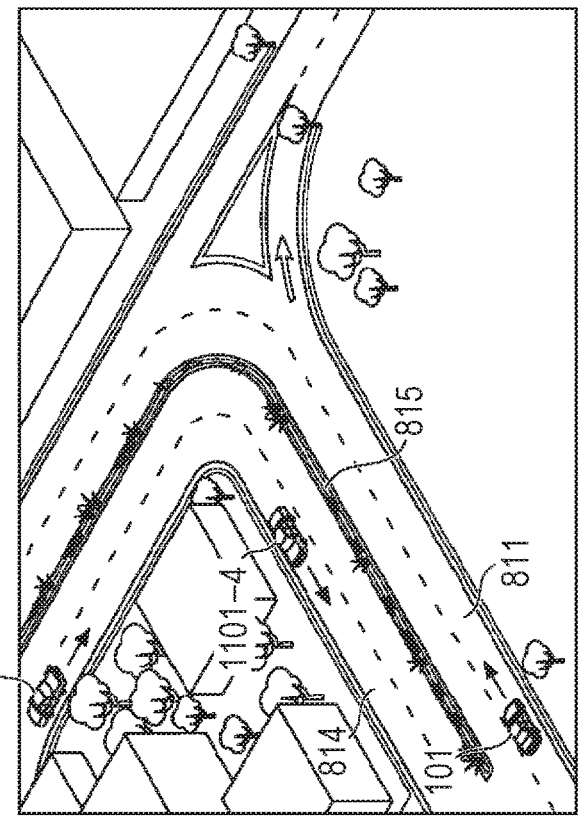
FIG. 8A and FIG. 8B are schematic drawings for explaining a process executed by the communication system according to the second embodiment.
Figure 8A:
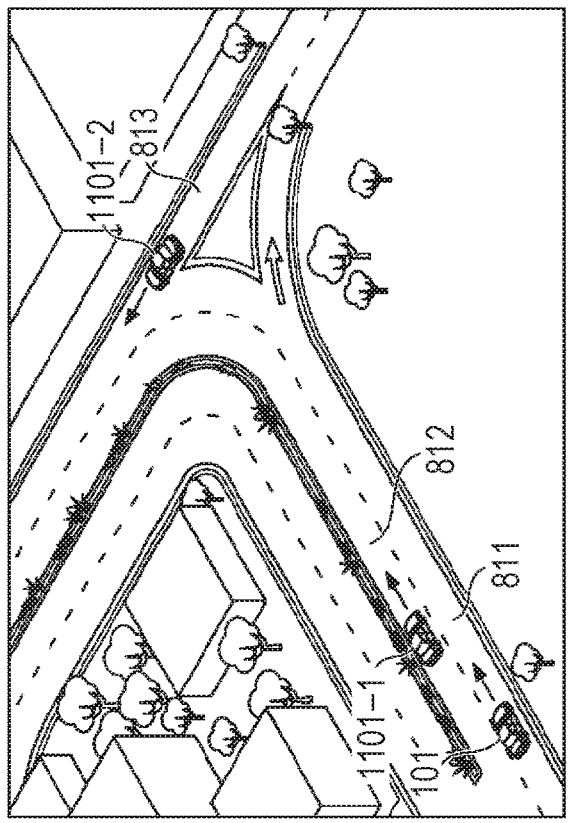

FIG. 8A and FIG. 8B are schematic drawings for explaining a process executed by the communication system according to the second embodiment. Referring to FIG. 8A, it will be assumed that the vehicle 101, having the communication device 110 mounted therein, is running in a first lane 811, in the direction indicated by the arrow. In this case, a first other vehicle 1101-1, running in a second lane 812 adjacent to the first lane 811 in the direction indicated by the arrow, is on the running route of the vehicle 101, and therefore it may be assumed that the second vehicle information of the vehicle 1101-1 is necessary, for example for a lane change operation. Likewise, a second other vehicle 1101-2, running in the direction indicated by the arrow in a third lane 813 merging with the first lane 811, is also on the e running route of the vehicle 101, and therefore it may be assumed that the second vehicle information of the vehicle 1101-2 is necessary, for example for a merging operation.

On the other hand, a fourth lane 814 in FIG. 8B, for driving in the opposite direction to the first lane 811 in which the vehicle 101 is running, is isolated from the first lane 811 by a median strip 815. Accordingly, a third and fourth other vehicles 1101-3 and 1101-4 running in the fourth lane 814 are not on the running route of the vehicle 101, and therefore it may be assumed that it is not necessary to acquire the second vehicle information.

The decision unit 701 decides whether the positions of the other vehicles 1101 are related to the running route of the vehicle 101, for example by plotting the coordinate of the vehicle 101, and the coordinate of the other vehicles 1101 included in the first vehicle information, using the map information on the geography around the vehicle 101.

For example, the decision unit 701 decides that the position information included in the first vehicle information is related to the running route of the own vehicle, upon acquiring the first vehicle information transmitted by the first other vehicle 1101-1 or the second other vehicle 1101-2 shown in FIG. 8A. In contrast, when only the first vehicle information transmitted by the other vehicle 1101-3 or the other vehicle 1101-4 shown in FIG. 8B has been acquired, the decision unit 701 decides that the position information included in the first vehicle information is not related to the running route of the own vehicle.

Figure 9:
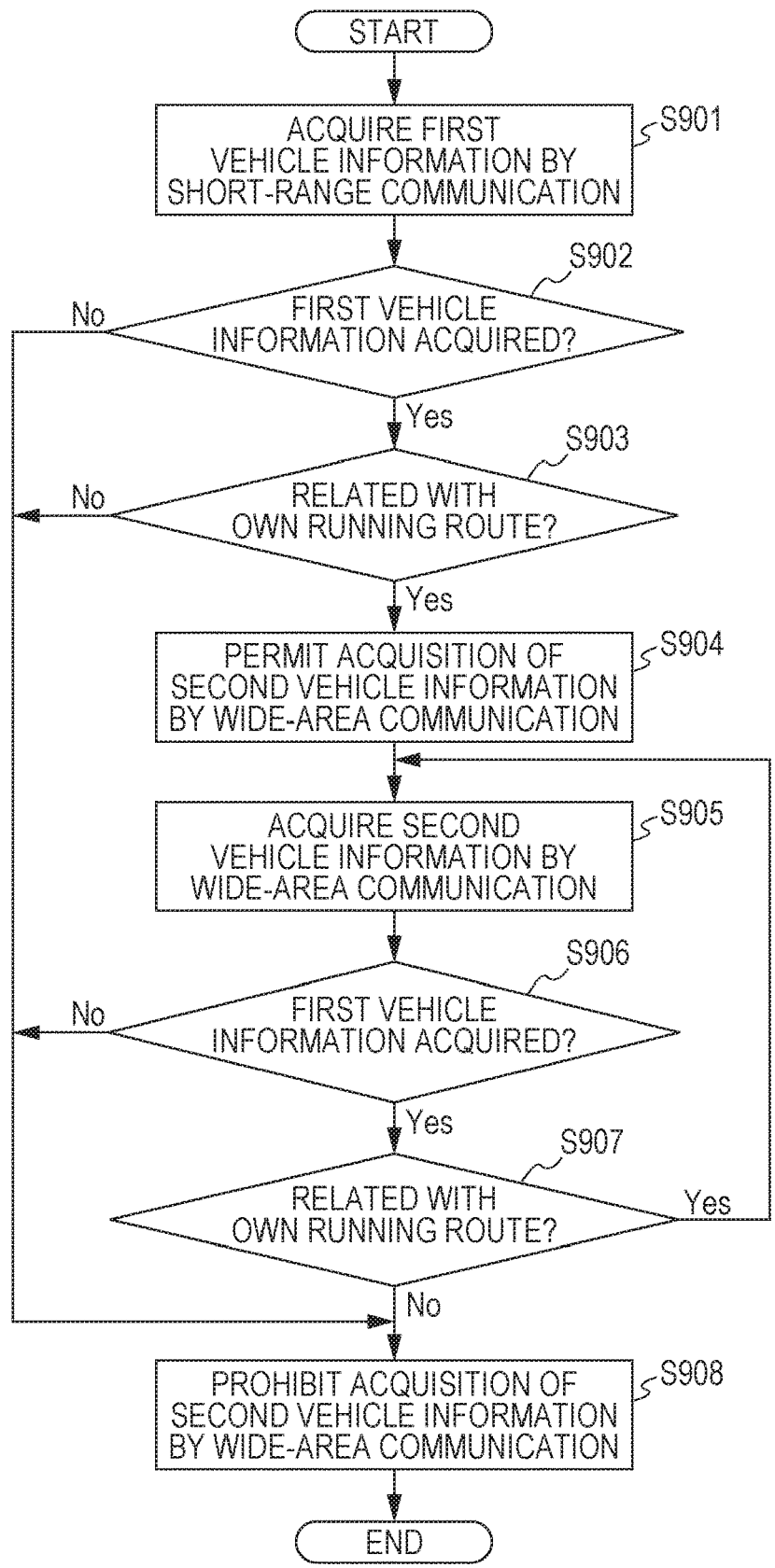
FIG. 9 is a flowchart showing a communication control process according to the second embodiment.

Here, it may be assumed that, basically, the mentioned decision is constantly being made by the automated driving system 130. Therefore, the communication device 110 may notify the acquired first vehicle information to the automated driving system 130, and in return acquire the information indicating whether the notified first vehicle information is related to the running route of the vehicle 101, from the automated driving system 130.
Operation Flow FIG. 9 is a flowchart showing the communication control process according to the second embodiment. The basic process is the same as the steps of the communication control process 1 shown in FIG. 4, and therefore detailed description of the similar steps will not be repeated.

At step S901, the first information acquisition unit 113 acquires, through the short-range communication, the first vehicle information form the other vehicle 1101 located inside the communication range 301 of the short-range communication.

At step S902, the communication control unit 114 decides whether the first information acquisition unit 113 has acquired the first vehicle information.

In the case where the first information acquisition unit 113 has failed to acquire the first vehicle information, the communication control unit 114 proceeds to step S908. In contrast, in the case where the first information acquisition unit 113 has acquired the first vehicle information, the communication control unit 114 proceeds to step S903.

At step S903, the decision unit 701 decides whether the position information included in the first vehicle information acquired by the first information acquisition unit 113 is related to the running route of the own vehicle.

For example, when the first vehicle information is acquired from the first other vehicle 1101-1 or the second other vehicle 1101-2 in the situation shown in FIG. 8A, the decision unit 701 of the vehicle 101 decides that the position information included in the first vehicle information is related to the running route of the own vehicle. In contrast, when the first vehicle information has been acquired from neither of the first other vehicle 1101-1 and the second other vehicle 1101-2, the decision unit 701 of the vehicle 101 decides that the position information included in the first vehicle information is not related to the running route of the own vehicle.

When the position information included in the first vehicle information is not related to the running route of the own vehicle, the decision unit 701 proceeds to step S908. In contrast, when the position information included in the first vehicle information is related to the running route of the own vehicle, the decision unit 701 proceeds to step S904.

At step S904, the communication control unit 114 permits the acquisition of the second vehicle information through the wide-area communication.

Through the mentioned steps S902 to S904, the communication control unit 114 permits the acquisition of the second vehicle information through the wide-area communication, in the case where the first information acquisition unit 113 has acquired the first vehicle information including the position information related to the running route of the own vehicle.

At step S905, the second information acquisition unit 115 acquires the second vehicle information through the wide-area communication, using the wide-area communication unit 112.

At step S906, communication control unit 114 again decides whether the first information acquisition unit 113 has acquired the first vehicle information.

In the case where the first information acquisition unit 113 has failed to acquire the first vehicle information, the communication control unit 114 proceeds to step S908. In contrast, in the case where the first information acquisition unit 113 has acquired the first vehicle information, the communication control unit 114 proceeds to step S907.

At step S907, the decision unit 701 decides whether the position information included in the first vehicle information acquired by the first information acquisition unit 113 is related to the running route of the own vehicle.

When the position information included in the first vehicle information is not related to the running route of the own vehicle, the decision unit 701 proceeds to step S908. In contrast, when the position information included in the first vehicle information is related to the running route of the own vehicle, the decision unit 701 returns to step S905, and permits continued acquisition of the second vehicle information through the wide-area communication.

At step S908, the communication control unit 114 permits the acquisition of the second vehicle information through the wide-area communication.

Through the foregoing process, the communication control unit 114 prohibits the acquisition of the second vehicle information through the wide-area communication, in the case where the first information acquisition unit 113 has failed to acquire the first vehicle information including the position information related to the running route of the own vehicle. Such an arrangement further minimizes the impact of the acquisition of the second vehicle information through the wide-area communication, on the mobile communication.

In this embodiment also, the communication control unit 114 may prohibit the acquisition of the second vehicle information through the wide-area communication, when the acquisition of the second vehicle information through the wide-area communication has been completed, for example through step S501 shown in FIG. 5.

Transmission of Vehicle Information

Although the reception operation of the vehicle information performed by the communication system 100 has been described with reference to the first and the second embodiment, it is preferable that actually the vehicle information transmission unit 116 transmits the vehicle information, in parallel with the reception of the vehicle information. An example of the communication control process, including the transmission of the vehicle information, will now be described.

Figure 10:
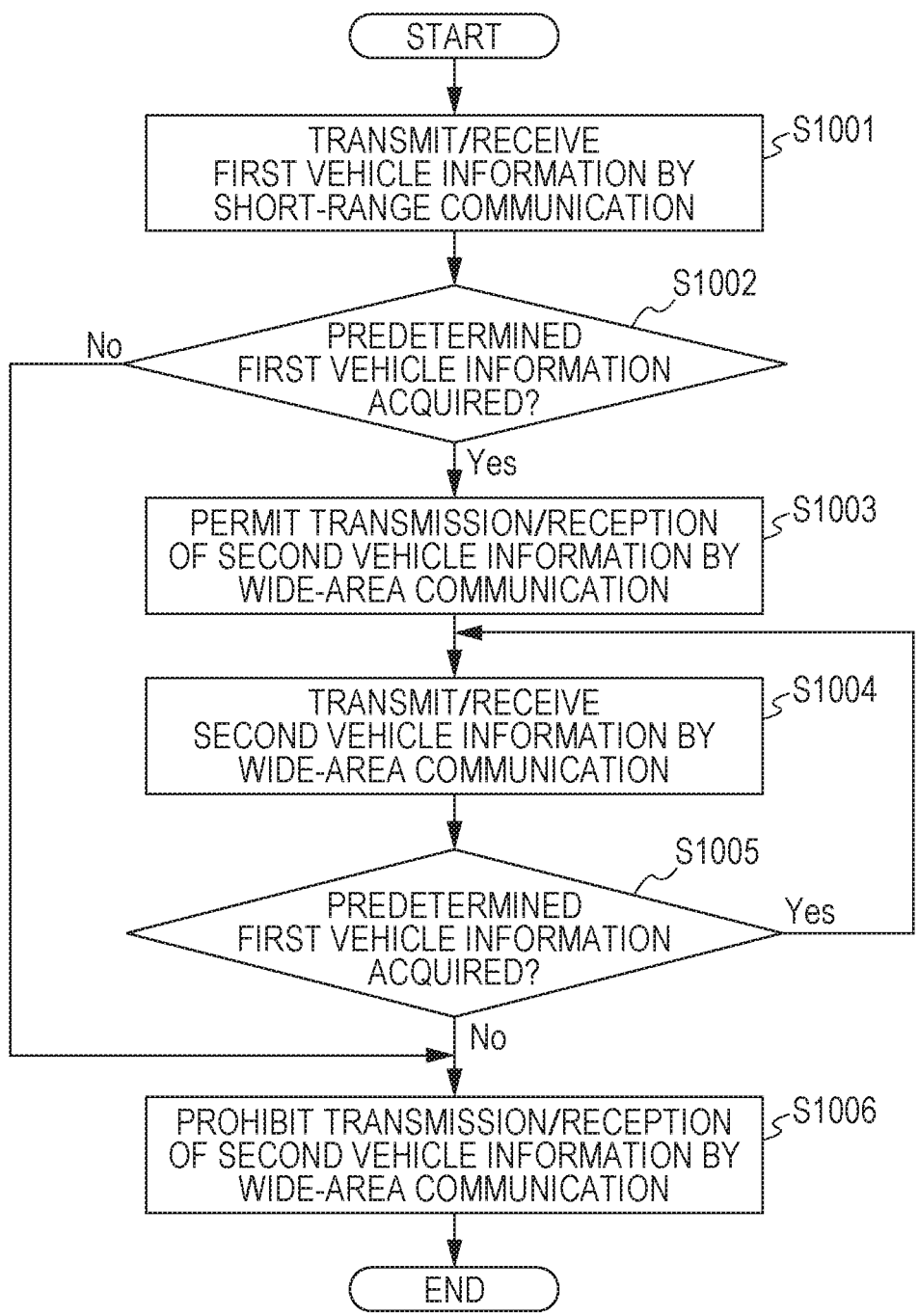
FIG. 10 is a flowchart showing a communication control process, including a transmission process, according to a third embodiment.

FIG. 10 is a flowchart showing the communication control process, including the transmission process according to a third embodiment.

At step S1001, the communication device 110 transmits and receives the first vehicle information, through the short-range communication. For example, the first information acquisition unit 113 acquires, through the short-range communication, the first vehicle information from the other vehicle 1101 located inside the communication range 301 of the short-range communication. The vehicle information transmission unit 116 also transmits the first vehicle information of the vehicle 101, through the short-range communication.

Preferably, the first vehicle information transmitted by the vehicle information transmission unit 116 may include information indicating that the second vehicle information can be provided through the wide-area communication (e.g., information permission flag of YES" shown in FIG. 2).

At step S1002, the communication control unit 114 decides whether the first information acquisition unit 113 has acquired the first vehicle information including the predetermined information.

The predetermined information includes, for example, the predetermined header information, the information indicating that the second vehicle information can be acquired through the wide-area communication, and the position information related to the running route of the own vehicle, as in the first and the second embodiment.

In the case where the first information acquisition unit 113 has failed to acquire the first vehicle information including the predetermined information, the communication control unit 114 proceeds to step S1006. In contrast, in the case where the first information acquisition unit 113 has acquired the first vehicle information including the predetermined information, the communication control unit 114 proceeds to step S1003.

Upon proceeding to step S1003, the communication control unit 114 permits the transmission and reception of the second vehicle information through the wide-area communication (or acquisition of the second vehicle information through the wide-area communication). Accordingly, the second information acquisition unit 115 is allowed to acquire the second vehicle information through the wide-area communication, and the vehicle information transmission unit 116 is allowed to transmit the second vehicle information of the vehicle 101, through the wide-area communication.

At step S1004, the communication device 110 transmits and receives the second vehicle information through the wide-area communication. For example, the second information acquisition unit 115 acquires the second vehicle information through the wide-area communication, using the wide-area communication unit 112. In addition, the vehicle information transmission unit 116 transmits the second vehicle information of the vehicle 101 through the wide-area communication, using the wide-area communication unit 112.

At step S1005, the communication control unit 114 again decides whether the first information acquisition unit 113 has acquired the first vehicle information including the predetermined information.

In the case where the first information acquisition unit 113 has failed to acquire the first vehicle information including the predetermined information, the communication control unit 114 proceeds to step S1006. In contrast, in the case where the first information acquisition unit 113 has acquired the first vehicle information including the predetermined information, the communication control unit 114 returns to step S1004, and permits continued transmission and reception of the second vehicle information through the wide-area communication.

Upon proceeding to step S1006, the communication control unit 114 prohibits the transmission and reception of the second vehicle information through the wide-area communication. As a result, the second information acquisition unit 115 is disabled from acquiring the second vehicle information, using the wide-area communication unit 112, and the vehicle information transmission unit 116 is disabled from transmitting the second vehicle information, using the wide-area communication unit 112.

As described above, the communication device 110 is restricted from transmitting and receiving the second vehicle information through the wide-area communication, in the case where the first vehicle information including the predetermined information is unable to be acquired through the short-range communication. Such an arrangement minimizes the impact on the mobile communication through the wide-area communication.

While there has been illustrated and described what is at present contemplated to be preferred embodiments of the present disclosure, it will be understood by those skilled in the art that various changes and modifications may be made, and equivalents may be substituted for elements thereof without departing from the true scope of the disclosure. In addition, many modifications may be made to adapt a particular situation to the teaching of the disclosure without departing from the central scope thereof. Therefore, it is intended that this invention not be limited to the particular embodiments disclosed, but that the invention will include all embodiments falling within the scope of the appended claims.

The invention claimed is:

1. A communication device to be mounted in a host vehicle, the communication device comprising:
a short-range communication unit configured to perform first wireless communication in a first communication range;
a wide-area communication unit configured to perform second wireless communication in a second communication range larger than the first communication range;
a first information acquisition unit configured to acquire first vehicle information from another vehicle located in the first communication range, through the first wireless communication;
a communication control unit configured to permit acquisition of second vehicle information from the another vehicle through the second wireless communication, when the first information acquisition unit has acquired the first vehicle information including predetermined information; and,
a second information acquisition unit configured to acquire the second vehicle information from the another vehicle located in the second communication range, through the second wireless communication, when the acquisition of the second vehicle information through the second wireless communication is permitted;
wherein if the first information acquisition unit has acquired the first vehicle information including position information indicating a position of the another vehicle is located on a running route of the host vehicle, then the communication control unit permits the acquisition of the second vehicle information through the second wireless communication.

2. The communication device according to claim 1, wherein the communication control unit is configured to prohibit the acquisition of the second vehicle information through the second wireless communication, when the first information acquisition unit has failed to acquire the first vehicle information including the predetermined information.

3. The communication device according to claim 1, wherein the communication control unit is configured to permit the acquisition of the second vehicle information through the second wireless communication, when the first information acquisition unit has acquired the first vehicle information including information indicating that the second vehicle information can be provided through the second wireless communication.

4. The communication device according to claim 1, further comprising a decision unit configured to decide whether the position information, included in the first vehicle information acquired by the first information acquisition unit, is related to the running route of the host vehicle, using map information on geography around the host vehicle.

5. The communication device according to claim 1, wherein the communication control unit is configured to permit the acquisition of the second vehicle information through the second wireless communication, upon acquiring the first vehicle information including predetermined header information.

6. The communication device according to claim 1, further comprising a vehicle information transmission unit configured to transmit, through the first wireless communication, the first vehicle information including information indicating that the host vehicle can provide the second vehicle information through the second wireless communication.

7. The communication device according to claim 6, wherein the vehicle information transmission unit is configured to transmit the second vehicle information of the host vehicle through the second wireless communication, when the acquisition of the second vehicle information from the another vehicle through the second wireless communication is permitted.

8. The communication device of claim 1, wherein if the first information acquisition unit has acquired the first vehicle information from the another vehicle further including information indicating the another vehicle is an autonomous vehicle, then the communication control unit permits the acquisition of the second vehicle information through the second wireless communication.

9. The communication device of claim 1, wherein if the first information acquisition unit has acquired the first vehicle information from the another vehicle further including information indicating the another vehicle is an emergency vehicle, then the communication control unit permits the acquisition of the second vehicle information through the second wireless communication.

10. The communication device of claim 1, wherein if the first information acquisition unit has acquired the first vehicle information from the another vehicle further including information indicating an information permission flag is set to YES, then the communication control unit permits the acquisition of the second vehicle information through the second wireless communication.

11. A communication device to be mounted in a host vehicle, the communication device comprising:
- a short-range communication unit configured to perform first wireless communication in a first communication range;
- a wide-area communication unit configured to perform second wireless communication in a second communication range larger than the first communication range;
- a first information acquisition unit configured to acquire first vehicle information from another vehicle located in the first communication range, through the first wireless communication;
- a communication control unit configured to permit acquisition of second vehicle information from the another vehicle through the second wireless communication, when the first information acquisition unit has acquired the first vehicle information including predetermined information; and,
- a second information acquisition unit configured to acquire the second vehicle information from the another vehicle located in the second communication range, through the second wireless communication, when the acquisition of the second vehicle information through the second wireless communication is permitted;
- wherein if the first information acquisition unit has failed to acquire the first vehicle information including position information indicating a position of the anther vehicle is located on a running route of the host vehicle, then the communication control unit prohibits the acquisition of the second vehicle information through the second wireless communication.

12. The communication device of claim 11, wherein if the first information acquisition unit has failed to acquire the first vehicle information from the another vehicle further including information indicating the another vehicle is an autonomous vehicle, then the communication control unit prohibits the acquisition of the second vehicle information through the second wireless communication.

13. The communication device of claim 11, wherein if the first information acquisition unit has failed to acquire the first vehicle information from the another vehicle further including information indicating the another vehicle is an emergency vehicle, then the communication control unit prohibits the acquisition of the second vehicle information through the second wireless communication.

14. The communication device of claim 11, wherein if the first information acquisition unit has failed to acquire the first vehicle information from the another vehicle further including information indicating an information permission flag is set to YES, then the communication control unit prohibits the acquisition of the second vehicle information through the second wireless communication.

15. The communication device of claim 11, wherein if the first information acquisition unit has failed to acquire the first vehicle information from the another vehicle further including information indicating a wide-area communication flag is set to YES, then the communication control unit prohibits the acquisition of the second vehicle information through the second wireless communication.

16. The communication device of claim 11, wherein if the first information acquisition unit has failed to acquire the first vehicle information from the another vehicle further including information indicating an information permission flag and a wide-area communication flag are both set to YES, then the communication control unit prohibits the acquisition of the second vehicle information through the second wireless communication.

17. A communication device to be mounted in a host vehicle, the communication device comprising:
- a short-range communication unit configured to perform first wireless communication in a first communication range;
- a wide-area communication unit configured to perform second wireless communication in a second communication range larger than the first communication range;
- a first information acquisition unit configured to acquire first vehicle information from another vehicle located in the first communication range, through the first wireless communication;
- a communication control unit configured to permit acquisition of second vehicle information from the another vehicle through the second wireless communication, when the first information acquisition unit has acquired the first vehicle information including predetermined information;
- a second information acquisition unit configured to acquire the second vehicle information from the another vehicle located in the second communication range, through the second wireless communication, when the acquisition of the second vehicle information through the second wireless communication is permitted; and,
- a vehicle information transmission unit configured to transmit, through the first wireless communication, the first vehicle information including information indicating that the host vehicle can provide the second vehicle information through the second wireless communication, if the first information acquisition unit has acquired the first vehicle information indicating a position of the another vehicle is located on a running route of the host vehicle.

18. The communication device according to claim 17, wherein the vehicle information transmission unit is configured to transmit the second vehicle information of the host vehicle through the second wireless communication, when the acquisition of the second vehicle information from the another vehicle through the second wireless communication is permitted.

* * * * *